Feb. 22, 1927.

J. E. BEARD 1,618,748

AUTOMOBILE BRAKE

Filed Dec. 7, 1925  2 Sheets-Sheet 1

Witness:
R. E. Hamilton

Inventor,
John E. Beard
By Warren D. House,
His Attorney.

Feb. 22, 1927.
J. E. BEARD
AUTOMOBILE BRAKE
Filed Dec. 7. 1925
1,618,748
2 Sheets-Sheet 2
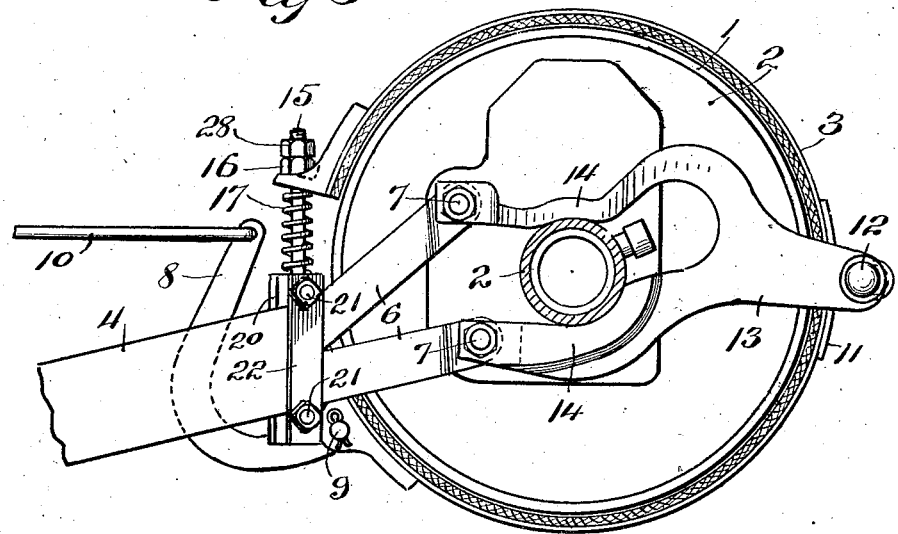
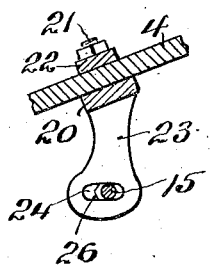
Inventor,
John E. Beard
By Warren D. House,
His Attorney.
Witness:
R. C. Hamilton Patented Feb. 22, 1927.

1,618,748

UNITED STATES PATENT OFFICE.

JOHN E. BEARD, OF KANSAS CITY, MISSOURI.

AUTOMOBILE BRAKE.

Application filed December 7, 1925. Serial No. 73,551.

My invention relates to improvements in automobile brakes.

It relates particularly to the type of automobile brakes in which the brake strap encircles a brake drum which is revoluble around the axle housing.

One of the objects of my invention is to provide in a brake of the kind novel means for supporting the brake strap by which the latter will exert a uniform pressure at the different points of contact with the brake drum, by which the brake strap will be held from lateral tipping and from cramping.

A further object of my invention is to provide novel means by which the braking pressure of the brake strap is applied to the brake drum.

Still another object of my invention is to provide a brake of the kind which is simple, cheap, strong, durable, not liable to get out of order and which is adapted to be readily applied to automobiles now in use.

The novel features of my invention are hereinafter fully described and claimed.

In the accompanying drawing, which illustrates the preferred embodiment of my invention, Fig. 1 is an outside elevation of my improved brake, portions of the axle housing, radius rod and brake rod being shown.

Fig. 3 is an inside elevation of the same.

Fig. 4 is a section on the line 4—4 of Fig. 1.

Similar characters of reference designate similar parts in the different views.

Figure 1:
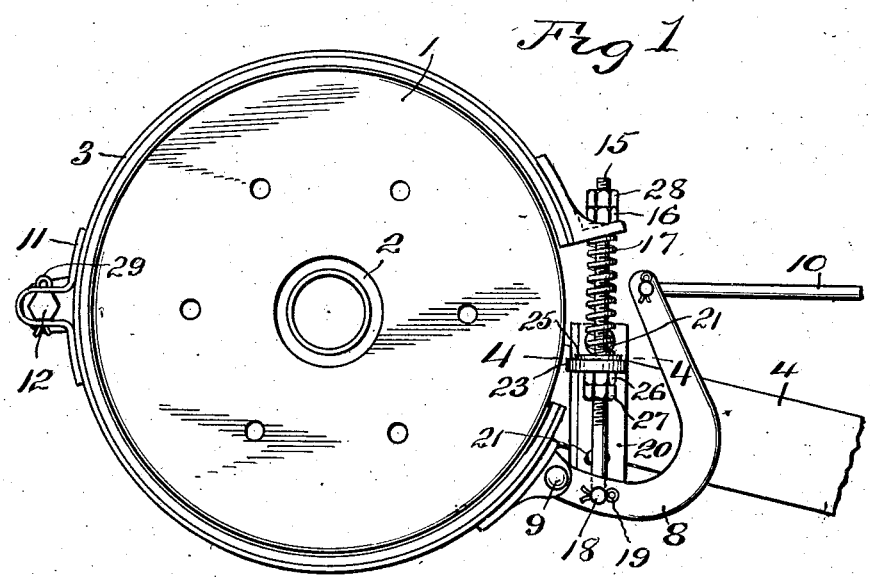
Figure 2:
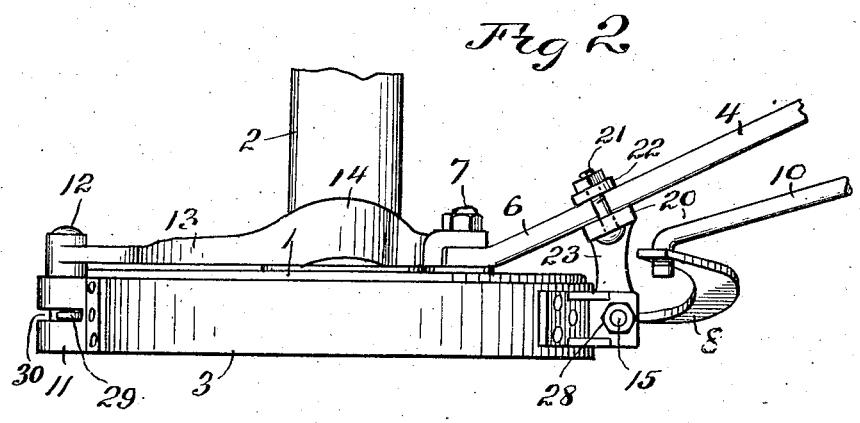
Fig. 2 is a top view of the same.

1 designates the usual brake drum, encircling the axle housing 2, and encircled by a brake strap 3, 4 a radius rod having two arms 6 respectively secured to the axle housing 2 by two bolts 7, Fig. 3, 8 a brake lever fulcrumed by a transverse pin 9 to the brake strap 3 adjacent to one end of the latter, and 10 the usual brake rod connected to the lever 8.

For supporting the brake strap 3, the latter has fastened to its rear side a clip 11 through which extends a transverse horizontal pin 12 on which the clip is forwardly and rearwardly slidable, the pin being mounted in the rear portion of a brake strap supporting member 13 having two arms 14, Fig. 3, through which respectively extend the bolts 7, which thus serve the double function of fastening the arms 6 of the radius rod and the arms 14 of the strap supporting member 13 to the axle housing 2.

The arms 14 intermediate of the pin 12 and the bolts 7 respectively embrace the upper and lower sides of the axle housing, thus affording a firm support for the member 13.

Connecting the brake lever 8 with the other end of the brake strap 3 is a member comprising a threaded rod 15, which at its upper portion extends through the strap 3 and has mounted on it a nut 16 which bears on the upper side of the brake strap 3, against the under side of which bears the upper end of a coil spring 17, which encircles the rod 15, the lower end of the latter having a lateral arm 18 which extends through a hole in the brake lever 8 and has removably mounted in it a cotter pin 19 at the other side of the lever 8.

A spring supporting means is provided for supporting the lower end of the spring 17, consisting of a vertical plate 20, which is held clamped to one side of the radius rod 4 by two bolts 21, which extend through a plate 22 bearing against the other side of the radius rod 4.

The plate 20 is provided at one side with a lateral lug 23 having therethrough a vertical slot 24, Fig. 4 in which the threaded rod 15 is longitudinally slidable and laterally movable toward and from the brake drum 1. The lower end of the coil spring 17 bears on a washer 25 which is on the rod 15 and which rests on the upper side of the lug 23.

When the brake rod 10 is drawn forwardly to set the brake, the lever 8 swinging on the arm 18, draws the rod 15 downwardly against the pressure of the spring 17, at the same time the brake strap 3, by means of the pin 9 and nut 16 is contracted, and, owing to the lateral movement of the rod 15 in the slot 24, and the slidable movement of the brake strap on the pin 12, the brake strap is applied to the brake drum 1 with a uniform pressure at all its bearing points, thus affording uniform wear on the brake lining.

By providing the member 13 with the two arms 14 which are fastened to the bolts 7 and which embrace the upper and lower sides of the axle housing, a firm support for the brake strap is afforded. By utilizing the bolts 7, which fasten the radius rod 4 to the axle housing, to fasten the member 13 to the axle housing, a very simple structure is provided, which eliminates the requirement of special fastening means not already provided in the car structure.

To hold the nut 16 from accidental turning, it has bearing against it a lock nut 28, mounted on the rod 15.

For limiting the expansion of the brake strap, a nut 26 on the rod 15 below the lug 23 is adapted to bear against the latter. A lock nut 27 on the rod 15 bears against the nut 26.

To hold the brake strap 3 from lateral movement, while permitting it to move toward and from the brake drum 1, a cotter pin 29 is mounted in the pin 12 and is disposed in a vertical slot 30 in the clip 11.

The provision of the lateral arm 18 at the lower end of the rod 15, and which extends through the brake lever 8, eliminates the necessity of flattening the rod and perforating it to receive a fastening bolt, which is also eliminated.

I do not limit my inventon to the structure shown and described, as modifications, within the scope of the appended claims, may be made without departing from the spirit of my invention.

What I claim is:—

1. In an automobile brake, the combination with an axle housing of an automobile, a radius rod having two arms, two bolts respectively fastening said arms to said housing, and a brake strap, of a supporting member carrying said brake strap and having two arms respectively fastened to said housing by said bolts and bearing respectively against opposite sides of said housing.

2. In an automobile brake, the combination with an axle housing of an automobile, and a brake strap, of a supporting member carrying said brake strap and having two arms fastened to said housing and bearing respectively at opposite sides of said housing intermediate of the points where the arms are fastened to said housing and the point at which the said member supports said brake strap.

In testimony whereof I have signed my name to this specification.

JOHN E. BEARD.